T. ARMAT.
PRODUCTION OF ANIMATED PICTURES.
APPLICATION FILED JULY 7, 1916.

1,390,861. Patented Sept. 13, 1921.

Inventor
Thomas Armat
By Church & Church
his Attorneys

UNITED STATES PATENT OFFICE.

THOMAS ARMAT, OF WASHINGTON, DISTRICT OF COLUMBIA.

PRODUCTION OF ANIMATED PICTURES.

1,390,861. Specification of Letters Patent. Patented Sept. 13, 1921.

Application filed July 7, 1916. Serial No. 108,016.

*To all whom it may concern:*

Be it known that I, THOMAS ARMAT, a citizen of the United States, residing at Washington, in the District of Columbia, have invented certain new and useful Improvements in the Production of Animated Pictures; and I do hereby declare that the following is a full, clear, and exact description of the same when taken in connection with the accompanying drawings, forming part of this specification.

In usual commercial practice animated or motion pictures are taken with a shutter having a single opening, making a single exposure during each period of film rest and the periods of rest and exposure recur at a rate of about sixteen per second. The standard size picture is three quarters of an inch long in the direction of its movement and with sixteen exposures per second a length of one foot of film is required for each second of the periods of taking and exhibiting, respectively.

The primary object of this invention is to economize in the length of film and number of separate picture areas necessary for properly representing the movements of an object during a given period of time. Further objects are to reduce the wear and tear on the film and to simulate more nearly the actual movements of the object when the pictures are projected on the exhibiting screen in sequence at slow speed as compared with the rate of projection necessary with ordinary films and apparatus.

In accordance with the present invention instead of making a single exposure on each picture area of the film, a plurality of exposures are made on each picture area and while not essential it is preferred that one exposure of each picture area shall be of longer duration that the other exposure or exposures of that area with the result that when there is lack of registry of the position of an object, due to its movement there is one dominant impression and one or more secondary impressions showing the object in succeeding positions. The successive exposures of each picture area of the film are made while the film is at rest and it is preferred that the first exposure shall be the longer or brighter to form the impression of dominant intensity. The periods of film movement recur at a rate substantially one half the rate of present practice or at approximately eight per second while the exposures occur at sixteen per second where double exposures of each picture area is desired and still more rapidly where more than two exposures on each picture area is desired.

The shutter openings in cameras taking pictures at the commercial rate of about sixteen per second usually vary from something less than 180° to 90° which gives exposures of from something less than $\frac{1}{32}$ of a second to $\frac{1}{64}$ of a second. From this it will be seen that from one-half to three-quarters of the recordable phases of motion are lost for fear that extension of the time for exposure would produce a blurred image. It is one of the purposes of this invention to record a greater number of phases of motion that would otherwise be lost and to do so without increasing the number of film areas employed or to reduce the number of film areas employed without decreasing the number of phases of progressive motion recorded.

Examination of a film produced with double exposure in accordance with this invention shows that there is no noticeable displacement of the pictures or impressions in each picture area in the larger proportion of the pictures even when examined under the microscope, but where the movement of the object is quite rapid and the object is near the camera, two impressions may be seen in each picture area, one somewhat less distinct than the other. When exhibited at a rate of eight per second, however, the double impressions merge into each other with a resultant simulation of continuous motion of the object as good as is obtained with the ordinary pictures exhibited at the rate of sixteen per second, and sometimes better, when a larger number of superposed impressions are made on each picture area because a greater number of progressive phases of motion are recorded and reproduced.

With this invention there is an economy of one hundred per cent. or more in the length of film necessary, there is less wear and tear on the film and the projected representation is steadier on the screen owing to the reduction in the number of film movements and consequent lessening of vibration of the projecting apparatus.

Figure 1:
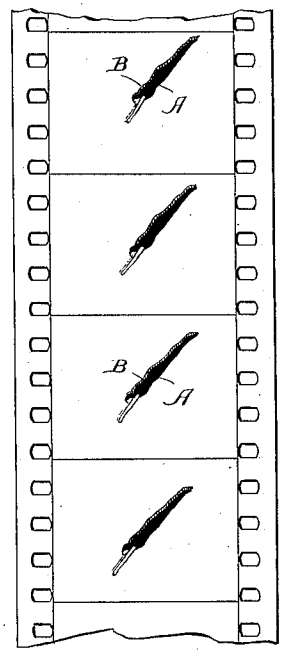
Figures 1, 2 and 3 are sections of film strips having representations of picture impressions thereon in accordance with this invention.
Figure 2:
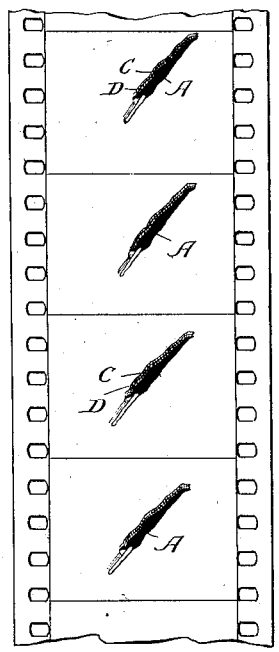
Figure 3:
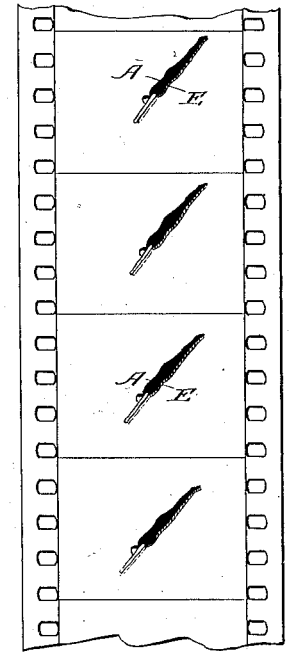

In Figs. 1, 2 and 3, the dominant or more distinct picture or impression is indicated at A. In Fig. 1 a film is shown with double exposure of each picture area the dominant impression A being the first impression and the secondary impression shows a somewhat fainter picture B slightly displaced with relation to the first owing to the movement of the object between the successive exposures.

In Fig. 2 three exposures of each picture area is indicated, the dominant picture or impression being followed by two others, C and D, showing the object in three successive positions in the same picture.

In Fig. 3 double exposure is indicated, but in this instance the shorter exposure is made first as indicated at E so as to produce a somewhat faint preliminary picture followed by the more distinct or dominant impression A. Obviously the dominant impression may be both preceded and followed by less prominent or lighter impressions in the same picture, this being simply a combination of the impressions or pictures indicated in Figs. 1 and 3, and for some classes of subjects this may be the preferable procedure.

Figure 4:
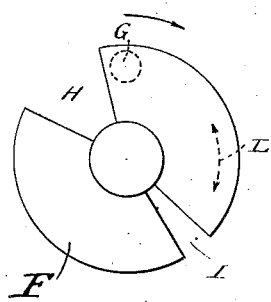
Figs. 4, 5 and 6 are diagrammatic representations of shutters for making the desired successive exposures of each picture area of the film.
Figure 5:
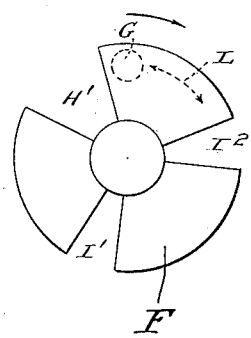
Figure 6:
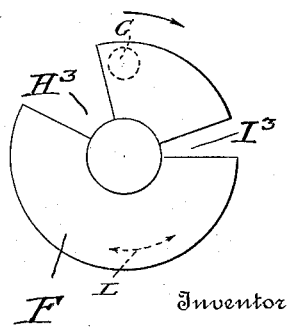

Various mechanical arrangements of shutter and camera mechanism will at once suggest themselves for carrying the invention into practice, but a simple arrangement of the shutter shown diagrammatically in Figs. 4, 5 and 6 is well suited to the purpose. In these figures a rotary shutter F is shown adapted to rotate in the direction of the arrow in front of a lens opening shown in dotted lines at G. The shutter in Fig. 4 is provided with two exposure openings H and I, the opening H being of greater width than the opening I to give the desirable longer exposure to one of the impressions. The film movement takes place while the aperture is masked by the part of the shutter indicated by the arrow L and consequently the first exposure will be long and the second short.

The arrangement indicated in Fig. 5 gives one long and two short exposures, the openings H', I' and I² being arranged in the order named after the film movement. The order of exposure is reversed in the arrangement shown in Fig. 6 where the narrow opening I³ precedes the wide opening H³ with relation to the period of film movement.

When pictures have been taken in the ordinary way at the usual rate of sixteen per second and it is desired to practice the present invention, a film may be produced therefrom by double printing each picture, that is to say, each picture area of the new film carries the impression of two succeeding pictures of the ordinary film but the total number of picture areas on the new film is one half the number on the ordinary film. In some instances three pictures taken at the rate of sixteen per second may be printed in one picture area in which event there will be but 5⅓ picture areas per second in the exhibited pictures.

To practice this invention it is not always necessary to give more than one exposure to each picture area throughout the entire length of the film, as more than one exposure may be only given to those parts of the film where the action is rapid or very near the camera, the balance of the film being given a single exposure.

What is claimed is:—

1. In the art of producing animated pictures, a film having thereon a series of picture areas with a plurality of impressions of the same object on the same area, said impressions being slightly displaced with relation to each other in the direction of movement of the object, and one of said impressions being dominant and the other secondary in intensity.

2. In the art of producing animated pictures, a film having a continuously progressive sequence of pictures of an object in motion, individual picture areas having a plurality of representations of the object, slightly displaced with relation to each other in the direction of movement of the object, one of said representations being dominant and the other secondary in intensity.

3. In the art of producing animated pictures, a film having a continuously progressive sequence of pictures of an object in motion, individual picture areas having a representation of dominating intensity of the object in one position and a representation of secondary intensity of the object in a slightly different position in the direction of movement of the object.

4. In the art of producing animated pictures, the process of producing a film which consists in making a plurality of exposures of an object in motion and from a single point of view on each succeeding picture area while the latter is at rest and in the same position whereby plural progressive impressions of the object are obtained in each picture area slightly displaced with relation to each other in the direction of movement of the object.

5. In the art of producing animated pictures, a film having thereon a series of picture areas with a plurality of progressive impressions of the same object on the same areas and progressive impressions on successive areas, all of said impressions being slightly displaced with relation to each other in the direction of movement of the object.

6. In the art of producing animated pictures, a film having a continuously progressive sequence of pictures of an object in motion, individual picture areas in the sequence having a plurality of representations of the object overlapping but slightly displaced with relation to each other in the direction of the movement of the object.

7. In the art of producing moving pictures, the method herein described of printing on succeeding picture areas progressive phases of the moving subject and on each area one over the other progressive intermediate phases of the moving subject whereby the number of phases of motion recorded may be increased with relation to the number of picture areas.

THOMAS ARMAT.